(12) United States Patent
Cantor

(10) Patent No.: US 7,546,583 B2
(45) Date of Patent: Jun. 9, 2009

(54) REAL OPTIONS BASED ITERATIVE DEVELOPMENT PROGRAM METRICS

(75) Inventor: Murray Cantor, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 11/179,200

(22) Filed: Jul. 12, 2005

(65) Prior Publication Data

US 2007/0016891 A1 Jan. 18, 2007

(51) Int. Cl.
*G06F 9/44* (2006.01)
*G06F 15/16* (2006.01)

(52) U.S. Cl. .................. 717/121; 717/101; 717/100; 709/205

(58) Field of Classification Search .......... 717/101, 717/100, 120–123; 709/205; 707/100
See application file for complete search history.

(56) References Cited

U.S. PATENT DOCUMENTS

| | | | |
|---|---|---|---|
| 5,274,812 A * | 12/1993 | Inoue ..................... 717/141 |
| 5,818,715 A | 10/1998 | Marshall et al. |
| 5,826,236 A | 10/1998 | Narimatsu et al. |
| 6,519,763 B1 | 2/2003 | Kaufer et al. |
| 6,609,100 B2 | 8/2003 | Smith et al. |
| 6,862,579 B2 * | 3/2005 | Mathews et al. .......... 705/36 R |
| 6,922,827 B2 * | 7/2005 | Vasilik et al. ............. 717/140 |
| 2005/0015743 A1 * | 1/2005 | O'Brien .................... 717/104 |
| 2005/0097509 A1 * | 5/2005 | Rong et al. ............... 717/106 |
| 2006/0064667 A1 * | 3/2006 | Freitas .................... 717/104 |
| 2006/0130011 A1 * | 6/2006 | Cornell et al. ............. 717/136 |
| 2006/0136865 A1 * | 6/2006 | Lin et al. .................. 717/105 |

OTHER PUBLICATIONS

Iterative and Incremental Development: A Brief History, Larman et al., IEEE, 2003, pp. 47-56.*
Tracking Real Earned Value, LiGuo Huang, University of Southern California, Mar. 2003, pp. 1-18.*
Value-Based Software Engineering: Reinventing "Earned Value" Monitoring and Control, Barry Boehm, LiGuo Huang, University of Southern California, ACM, 2003, pp. 1-7.*
Concepcion, A.I.; Lin, S.; Simon, S.J.; Managing the software development by using the recursive multithreaded (RMT) tool; IEEE, Aug. 1999, pp. 344-353.*

(Continued)

*Primary Examiner*—Wei Y Zhen
*Assistant Examiner*—Satish Rampuria
(74) *Attorney, Agent, or Firm*—C.. Steven Kurlowecz, Esq.; Steven M. Greenberg, Esq.; Cary Rodriguez Greenberg & Paul LLP

(57) ABSTRACT

Embodiments of the present invention address deficiencies of the art in respect to iterative project management and provide a method, system and computer program product for utilizing real options based iterative development program metrics. In an embodiment of the invention, a data processing system configured for software project management can include a computer aided software engineering tool enabled to use a methods architecture configured to manage iterative development, said as Rational Unified Process (TM) (RUP) methodware. The data processing system also can include a data store of unified process data produced by the computer aided software engineering tool. Finally, the data processing system can include real options-based computational logic.

2 Claims, 2 Drawing Sheets

OTHER PUBLICATIONS

Bygstad, B.; Controlling iterative software development projects: the challenge of stakeholder and technical integration; IEEE, Jan. 5-8, 2004, pp. 1-10.*

Jalote, P.; Agrawal, N.; Using defect analysis feedback for improving quality and productivity in iterative software development; IEEE, Dec. 5-6, 2005, pp. 703-713.*

Cantor, Murray; Real Metrics to Drive Product Development: Using Real Earned Value to Manage Risk and Create Value; IBM White Paper, Dec. 2004.

Convis, D.B., et al, Research Disclosure, *Development Metrics*, MA888-0092, Jul. 1989, No. 303.

* cited by examiner

REAL OPTIONS BASED ITERATIVE DEVELOPMENT PROGRAM METRICS

BACKGROUND OF THE INVENTION

1. Field of the Invention

The$_{[SMG1]}$ present invention relates to field of software and software system development and more particularly to the model driven development of a software application.

2. Description of the Related Art

Modern systems have become increasingly integrated open-ended and are increasingly dependent on their embedded software to deliver functionality. Modern software applications are expected to deliver critical computing services in a dependable manner across multiple, heterogeneous computing environments. To better manage the complexity of developing modern software or systems, development strategies can be employed which raise the level of abstraction at which systems are conceived, implemented and evolved.

"Methodware" refers to a unified framework for system development project management. Generally, a unified framework provides both course and granular methods within a methods architecture for specifying, planning and executing a software or system development project. Course framework methods refer to the specification of the entirety of the development project in accordance with the business requirements and resources allocable for the project. Granular framework methods refer to the planning of different iterations of the project specification in order to achieve milestones for each development phase. The latter portion of a unified framework can be automated and can involve generalized project management tools.

The Rational Unified Process™ (RUP) and its extension RUP SE™ are iterative, life cycle development unified frameworks for developing software and systems. RUP and RUP SE provide guidance on how to manage programs with inherent initial uncertainty. An important aspect of both RUP and RUP SE that they entail a sequence of iterations in which the system or software is built up in increments. These iterations are intended to provide the program managers control points, which can be used to assess results achieved and reset the project activities to maximize the likelihood of achieving the overall program goals.

In the study of planning different iterations of a project specification, it has been well established that system and software development projects are inherently uncertain and nonlinear. Nevertheless, standard "earned value" methods for evaluating the budget and schedule status of programs do not account for the uncertainty of the initial program cost and schedules and estimates. Moreover, standard earned value methods for evaluating the budget and schedule status of programs assume a linear relationship between the effort expended and dollars spent and the results achieved.

In RUP and RUP SE, the going-forward plan is reassessed at the conclusion of each iteration of a development project. Generally, major milestones such as phase boundaries and iterations in the RUP and RUP SE project are static while the detail activities are dynamic. Thus, at each milestone, it would be advantageous to apply program metrics to facilitate an ongoing evaluation of the cost to complete the project and the likely return expected for the completed project.

In U.S. Pat. No. 6,862,579 to Matthews et al. for SYSTEMS, METHODS AND COMPUTER PROGRAM PRODUCTS FOR PERFORMING A GENERALIZED CONTINGENT CLAIM VALUATION (hereinafter Matthews), a methodology is disclosed which relates to the valuation of a contingent claim through an initial determination of the present value distribution of contingent future benefits attributable to the exercise of a contingent claim. The Matthews methodology, referred to in the art as the Datar-Matthews algorithm, is closely related to the Black-Sholes methodology for options valuation in the financial markets. However, Matthews specifically proposes to apply the valuation of the contingent claim to project analysis.

In particular, in Matthews, it is suggested that the Datar-Matthews algorithm can be applied to a series of contingent claims which occur at different points in time in the future. In this situation, an election can be made during the course of a project to make further investments in the project, or to terminate the project based upon the application of the Datar-Matthews algorithm. Notwithstanding, an optimal application of Datar-Matthews algorithm to project analysis in the context of methodware cannot be realized in that the Datar-Matthews algorithm computes the volatility of the parameter for the Black-Scholes method only at the outset of the project. Yet, it is to be recognized by the skilled artisan that the volatility of a project changes from iteration to iteration in the project development lifecycle.

BRIEF SUMMARY OF THE INVENTION

Embodiments of the present invention address deficiencies of the art in respect to iterative project management and provide a novel and non-obvious method, system and computer program product for utilizing real options based iterative development program metrics. In an embodiment of the invention, a data processing system configured for software project management can include a computer aided software and system engineering tool enabled to use a methods architecture configured to manage iterative development, said as RUP methodware. The data processing system also can include a data store of unified process data produced by the computer aided software and system engineering tool. Finally, the data processing system can include real options-based computational logic.

The real options-based computational logic can be enabled to compute a real earned value, REV(i) at each iteration boundary utilizing a real program value, RPV(i) based upon a volatility parameter computed at the iteration boundary. For instance, the volatility parameter can be part of a delphi determination in a Black-Scholes equation. The REV(i) can be computed based upon the difference between management leverage, ML(i) at the iteration boundary and an initially computed management leverage, ML(0). In this regard, the ML(0) can be computed based upon the quotient between an initial real program value, RPV(0) and an initial estimated cost to complete, ETC(0). Likewise, the ML(i) can be computed based upon the quotient between RPV(i) and an estimated cost to complete at the iteration boundary, ETC(i).

In another embodiment of the invention, a real options-based program metrics utilization method can include computing a real earned value for a development project at each iteration boundary of the development project. In particular, the computing of a real earned value for a development project at each iteration boundary of the development project can include computing a real earned value for a development project based upon a real program value computed at the iteration boundary incorporating a volatility parameter computed at the iteration boundary. Optionally, the computing of a real earned value for a development project at each iteration boundary of the development project can include computing a real earned value for a development project based upon a constant real program value.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for real options-based iterative development program metrics. In accordance with an embodiment of the present invention, a real program value for a project can be calculated at each iteration performed for the software development project. At each iteration, the delphi calculation of Black-Scholes can be re-applied to calculate a sequence, ($RPV_i$) of real program values. Management leverage (ML) further can be defined as the quotient of $\Delta RPV_i$ ($RPV_i$-$RPV_0$) and the estimated cost to complete ($ECC_i$) the project at the iteration boundary $ML_i$=$RPV_i$/$ECC_i$.

The ECC can be found using any cost and effort estimation method than returns both a nominal value and a variance, such as the delphi method. It is to be recognized, however, that the ECC calculation is likely to produce the clearest result in a post-architecture phase of program management for a software application since the post-architecture phase requires some partitioning of the effort resulting in a more accurate value for the volatility parameter. At the pre-architecture phase, estimation techniques also can provide an adequate estimate of volatility. In the absence of an estimation of the volatility parameter, though, the ECC calculation can be performed, even in the pre-architecture phase, albeit resulting in a greater degree of uncertainty.

If, at the beginning of the program, the management leverage is negative (ML<0), the project can be viewed as a bad investment. Over the course of the program, at each iteration boundary, the project manager can compute the management leverage, $ML_i$. The $ML_i$ calculation can account for the results achieved, reductions in uncertainty reflected in the re-computed volatility parameter, and changes in the market or strategic value of program. Consequently, Real Earned Value (REV) can be defined at each iteration boundary as the difference between the initial $ML_0$ and the iteration $ML_i$, for instance $REV_i$=$ML_i$-$ML_o$. In some situations, the calculation can be simplified by assuming that the value of the delivered program is constant across the development.

Figure 1:
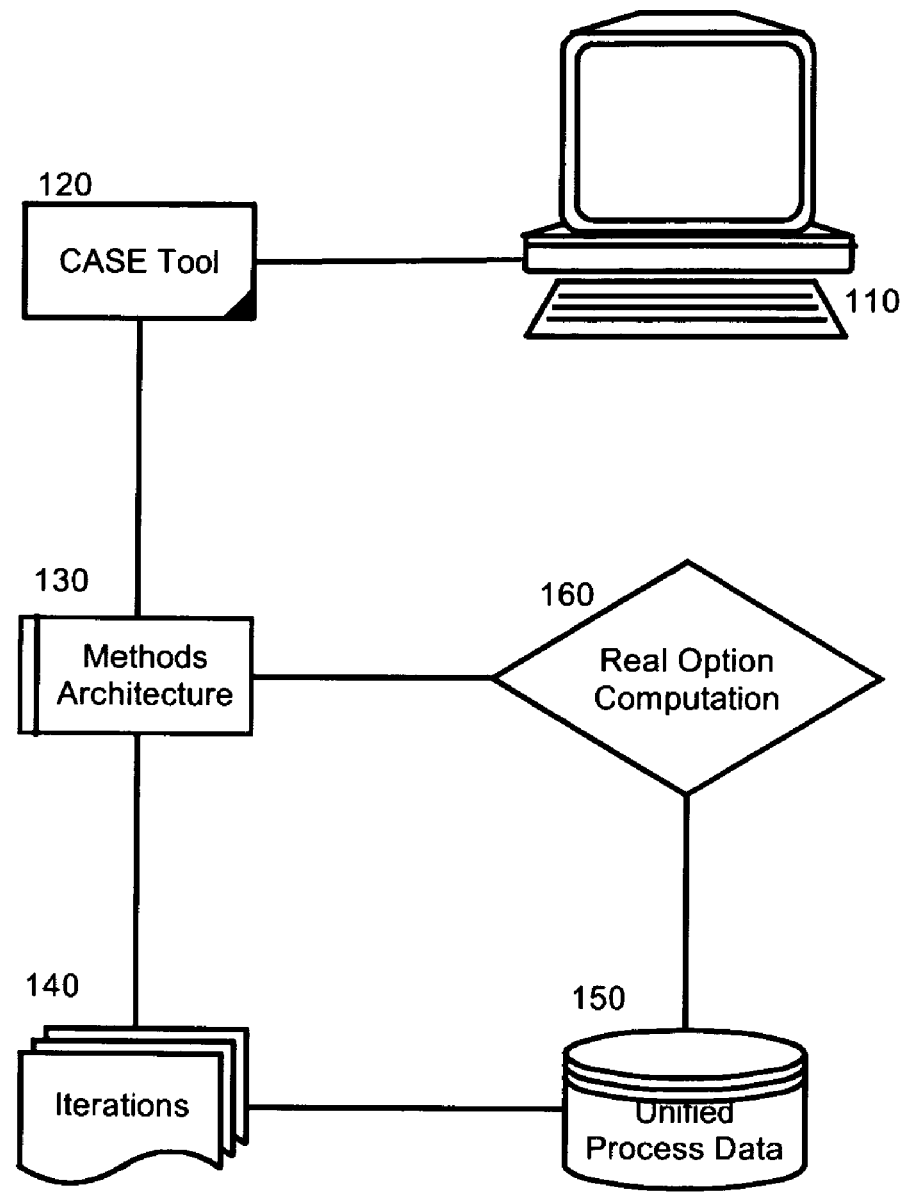
FIG. 1 is a schematic illustration of a data processing system enabled to utilize real options-based iterative development program metrics; and, FIG. 2 is a flow chart illustrating a process for producing real options-based iterative development program metrics in the system of FIG. 1.

In further illustration, FIG. 1 is a schematic illustration of a data processing system enabled to utilize real options-based iterative development program metrics. The data processing system can include a host computing platform 110 enabled to host the operation of a computer aided software engineering tool 120. The computer aided software engineering tool 120, in turn, can be configured to incorporate a methods architecture 130, for example RUP methodware. The methods architecture 130 can reduce a software development project into a series of iterations 140, each iteration advancing the development effort.

Notably, real option computation logic 160 can be coupled to the methods architecture 130 and to unified process data 150 produced in the course of managing the iterations 140 of the methods architecture 130. The real option computation logic 160 can be enabled to compute an initial RPV and ETC, resulting in an initial ETC. In this regard, the initial RPV can be computed based upon an initially computed volatility parameter for the software development project.

Subsequently, at each boundary in the iterations 140, the volatility can be recomputed for use in an RPV calculation for unified process data 150 produced for the concluded iteration. An ETC further can be computed for the unified process data 150 produced for the concluded iteration in order to compute an ML for the concluded iteration. Consequently, real option-based program metrics can be produced for a project manager at each iteration boundary utilizing an updated volatility parameter. Based upon the real option-based program metrics, the project manager can undertake strategic decisions whether to continue to invest in the software development project, or whether to terminate the software development project.

Figure 2:
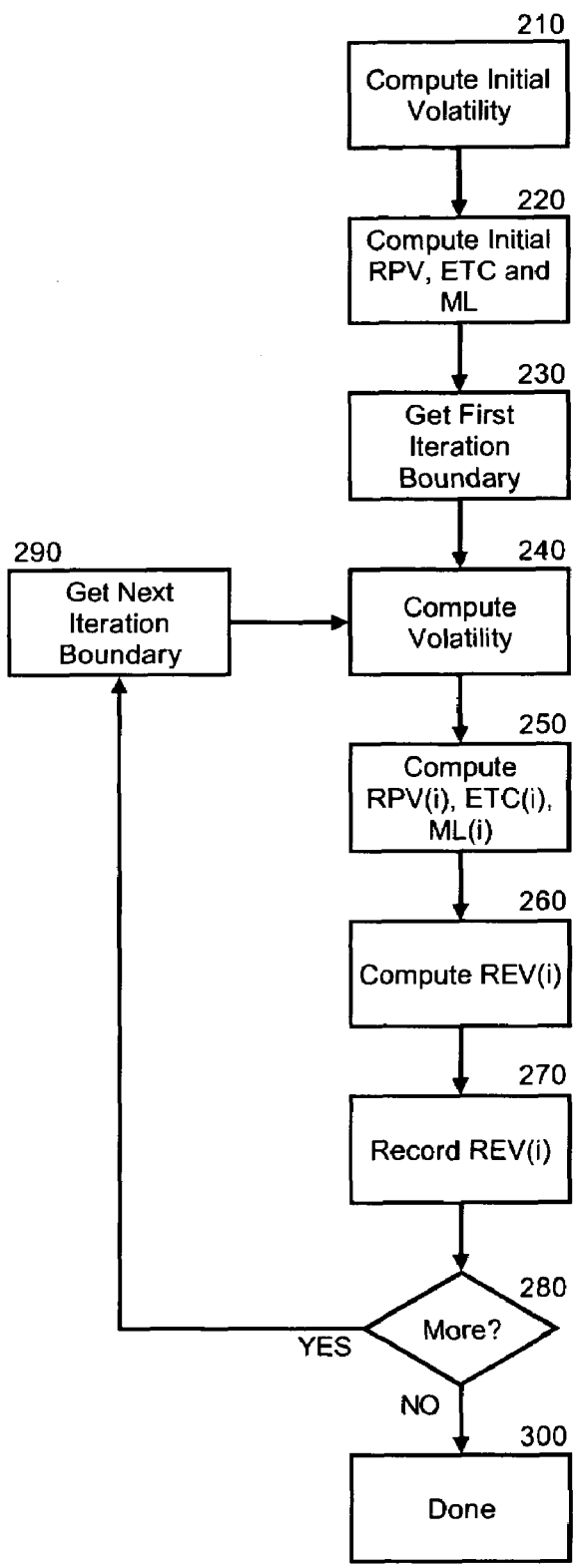

In more particular illustration, FIG. 2 is a flow chart illustrating a process for producing real options-based iterative development program metrics in the system of FIG. 1. Beginning in block 210, an initial volatility can be computed as part of a delphi application in the Black-Scholes equation. Likewise, in block 220 an initial RPV, ETC and ML can be computed for the project at time=0. Subsequently, in block 230 a first iteration boundary can be detected and in block 240, the volatility parameter can be computed again.

Consequently, in block 250 an RPV(i), ETC(i) and an ML(i) can be computed for the concluded iteration i in order to produce REV(i) for the iteration. Finally, in block 270, the REV(i) can be recorded for use by an operator in analyzing the progress of the software development project. The process can continue through decision block 280 and in block 290 until no more iterations remain to be processed. Subsequently, the process can end in block 300.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A real options-based program metrics utilization method comprising computing a real earned value for a development project at each iteration boundary of said development project, wherein said computing a real earned value for a development project at each iteration boundary of said development project comprises:

in a pre-architecture phase of said development project, computing a real earned value for a development project based upon a real program value computed at said iteration boundary incorporating a volatility parameter estimated for said iteration boundary; and, in a post-architecture phase of said development project, computing a real earned value for a development project based upon a real program value computed at said iteration boundary incorporating a volatility parameter computed for said iteration boundary.

2. A computer program product comprising a computer readable medium having computer usable program code for real options-based program metrics utilization, said computer program product including computer usable program code for computing a real earned value for a development project at each iteration boundary of said development project, wherein said computer usable program code for computing a real earned value for a development project at each iteration boundary of said development project comprises:

computer usable program code for, in a pre-architecture phase of said development project, computing a real earned value for a development project based upon a real program value computed at said iteration boundary incorporating a volatility parameter estimated for said iteration boundary; and, computer usable program code for, in a post-architecture phase of said development project, computing a real earned value for a development project based upon a real program value computed at said iteration boundary incorporating a volatility parameter computed for said iteration boundary.

* * * * *